United States Patent Office 3,000,858
Patented Sept. 19, 1961

3,000,858
ORGANOPOLYSILOXANE COMPOSITION
John F. Brown, Jr., Schenectady, N.Y., assignor to General Electric Company, a corporation of New York
No Drawing. Filed Jan. 21, 1959, Ser. No. 788,067
3 Claims. (Cl. 260—46.5)

This invention is concerned with a novel phenylpolysiloxane having the general formula $$(C_6H_5SiO_{3/2})_{12}$$

and methods for preparing the same. More particularly, the invention is concerned with a novel phenylpolysiloxane of the above formula which is believed to have the structure

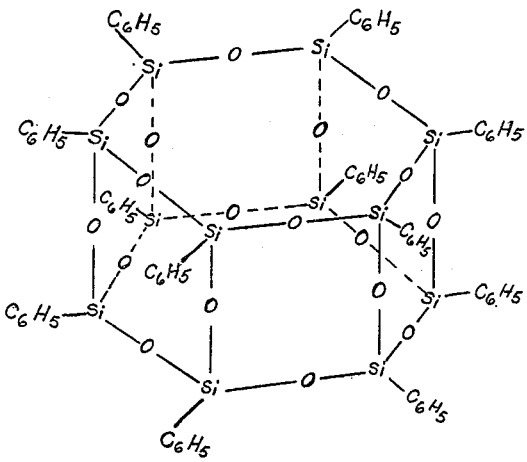

The above-identified phenyl silsesquioxane is fusible and can be heated in the absence of a catalyst at elevated temperatures of about 350 to 550° C. to effect conversion of the fusible material to an infusible higher molecular weight polymer which is soluble in various solvents such as, for instance, tetrahydrofuran, benzene, etc., and which has good heat resistance at temperatures ranging from about 300 to 500° C. even in air, and is capable of forming films having good insulating characteristics, making it suitable as insulation for conductors, etc. The phenylsilsesquioxane can be employed as an intermediate in the preparation of still higher molecular weight polymers of intrinsic viscosity (when measured in benzene) of at least 0.40 as is more particularly disclosed and claimed in the copending application of John F. Brown and Lester H. Vogt, Serial No. 788,069, filed concurrently herewith and assigned to the same assignee as the present invention.

Various methods may be employed to prepare the phenylsilsesquioxane described above. One process comprises hydrolyzing a phenyltrihydrolyzable silane such as phenyltrichlorosilane, phenyltriethoxysilane, etc., with water, dissolving the formed hydrolysis product in tetrahydrofuran (which apparently is a very critical solvent), and heating the mixture at a temperature of from about 25 to 80° C. with an alkaline material, for instance, alkalimetal hydroxides (e.g., potassium hydroxide, sodium hydroxide, cesium hydroxide, etc.); quaternary ammonium compounds (e.g., tetramethyl ammonium hydroxide, benzyl trimethyl ammonium hydroxide, etc.), quaternary phosphonium hydroxides [e.g., tetra-(n-butyl) phosphonium hydroxide, etc.], etc. The amount of catalyst used may be varied widely, but generally is within the range of about 2 to 5%, by weight, based on the weight of the hydrolyzate. The solution in tetrahydrofuran may contain on a weight basis from 5 to 40% of the phenylsilane hydrolyzate, based on the total weight of the latter and the solvent.

In order that those skilled in the art may better understand how the invention may be practiced, the following examples are given by way of illustration and not be way of limitation.

Example 1

106.5 grams of phenyltrichlorosilane (0.5 mol) was dissolved in 500 ml. benzene and shaken with water until hydrolysis was complete. After washing the hydrolysis product with water, 16.6 ml. of a commercial 30% benzyltrimethylammonium hydroxide solution (0.03 mol) was added and the mixture heated at the reflux temperature of the mass for 4 hours. The mass was then allowed to cool and remain for about 96 hours, at the end of which time the slurry obtained was heated again at the reflux temperature of the mass for another 24 hours and then cooled and filtered. This yielded about 57.0 grams of octaphenylsilsesquioxane having the formula $$(C_6H_5SiO_{3/2})_8$$

Example 2

To a mixture comprising 12 grams phenyltriethoxysilane, 50 ml. tetrahydrofuran, 0.25 gram tetraethyl ammonium hydroxide, and 2.8 grams water were added for seeding purposes a few crystals of the octaphenylsilsesquioxane of Example 1. The mixture was then heated at the reflux temperature of the mass for about 96 hours, about half the solvent was removed by distillation, and the refluxing then continued for another 16 hours. Upon cooling the mass, there was deposited a crystalline material which, upon recrystallization with benzene in a Soxhlet, gave 3.34 grams of the dodecaphenylsilsesquioxane of Formula I. This material had a melting point of about 380–390° C. in contrast to the octaphenylsilsesquioxane which did not melt below 440° C. The structure of the dodecaphenylsilsesquioxane was established by infrared examination and also by molecular weight (ebullioscopic in benzene) where it was found the molecular weight was about 1500 as contrasted to the theoretical molecular weight of the dodecaphenylsilsesquioxane of about 1550.

Example 3

A homogeneous mixture of 12 grams phenyltriethoxysilane (0.05 mol), 0.5 gram water, 2.3 grams of 9.5% aqueous tetraethyl ammonium hydroxide (a total of 0.15 mol water and 0.0017 mol base), and 45 grams freshly distilled tetrahydrofuran was allowed to stand at about 25–30° C. for 139 days. The crystalline deposit was filtered and dried to give (in a yield of about 69%) impure dodecaphenylsilsesquioxane having a melting point of about 367–370° C. This product was further purified as described below.

Example 4

About 423.1 grams (2.0 mols) phenyltrichlorosilane was dissolved in 800 ml. anhydrous diethyl ether, and thereafter 216.2 grams (12 mols) water was added slowly with stirring and cooling at such a rate so as to maintain the temperature at around 25–30° C. The hydrolyzate solution was washed several times with water until it was free of acid and then evaporated on a steam bath until syrupy. The syrup was heated to 110° in vacuum for three hours, cooled, and the resulting glassy resin ground up. A solution of 100 g. of this resin in 210 ml. of freshly distilled tetrahydrofuran was prepared and mixed with a solution of 10.9 g. tetramethylammonium hydroxide pentahydrate in 90 ml. of 95% ethanol. The mixture was refluxed with stirring for 64 hours, cooled, and filtered. The crystals were washed with benzene and air dried to give 41 g. of impure dodecaphenylsilsesquioxane.

The impure dodecaphenylsilsesquioxane obtained in Examples 3 and 4 was air-dried after which it was heated in a vacuum oven at 150° C. for 15 hours to decompose the base and thereafter re-crystallized from toluene three times to give pure dodecaphenylsilsesquioxane melting at 385° C. This latter material was analyzed and found to contain 56.1% carbon and 4.3% hydrogen, as contrasted to the theoretical values for $C_{72}H_{60}Si_{12}O_{18}$ of 55.8% carbon and 3.9% hydrogen. Determination of molecular weight (benzene ebullioscopic) showed the composition to have a molecular weight of 1500, as contrasted to the theoretical molecular weight of 1550.

The dodecaphenylsilsesquioxane was found to be soluble in pure tetrahydrofuran at 28° in an amount equal to 0.06 gram per 100 ml. of the solvent. The above silsesquioxane also dissolves quite easily in diphenyl and diphenyl ether at 90–95° C. The solubility of the dodecaphenylsilsesquioxane in toluene at 100° C. was found to be 32.6 grams/100 ml. solvent.

One of the more important uses for the dodecaphenylsilsesquioxane is as a polymerizable plasticizer for the higher molecular weight phenylsilsesquisiloxane disclosed and claimed in the above mentioned Brown and Vogt application. Thus, the presence of from 10 to 50%, by weight, of the phenylsilsesquioxane based on the weight of the higher polymers, permits fabrication of articles from the higher polymers by conventional pressing or molding procedures at temperatures around 350 to 450° C. The phenylsilsesquioxane present in the higher molecular weight polymers, in addition to contributing to its function as a plasticizer, is converted to a higher molecular weight material by the heat treatment, thus becoming part of a final, homogeneous polymeric structure.

It will, of course, be apparent to those skilled in the art that other conditions of reaction, as well as other ingredients may be employed in making the phenylsilsesquioxane of the instant invention.

What I claim as new and desire to secure by Letters Patent of the United States is:

1. The chemical composition dodecaphenylsilsesquioxane having the formula $(C_6H_5SiO_{3/2})_{12}$.

2. The process for making dodecaphenylsilsesquioxane of the formula $(C_6H_5SiO_{3/2})_{12}$ which comprises heating the hydrolyzate of a phenyltrihydrolyzable silane selected from the class consisting of phenyltriethoxysilane and phenyltrichlorosilane with an alkaline material selected from the class consisting of quaternary ammonium compounds, quaternary phosphonium hydroxides, and alkali metal hydroxides, in the presence of tetrahydrofuran as a solvent for the hydrolyzate.

3. The process as in claim 2 wherein the phenyltrihydrolyzable silane is phenyltriethoxysilane.

References Cited in the file of this patent

UNITED STATES PATENTS

| | | |
|---|---|---|
| 2,465,188 | Barry et al. | Mar. 22, 1949 |
| 2,482,276 | Hyde et al. | Sept. 20, 1949 |
| 2,610,169 | Hyde et al. | Sept. 9, 1952 |
| 2,901,460 | Boldebuck | Aug. 25, 1959 |

OTHER REFERENCES

Barry et al.: J. Am. Chem. Soc., vol. 77, pages 4248 to 4252 (1955).